United States Patent [19]

Radoy et al.

[11] Patent Number: 4,568,050

[45] Date of Patent: Feb. 4, 1986

[54] COMPONENT FURNITURE ASSEMBLY

[75] Inventors: Paul D. Radoy, St. Charles, Ill.; Walter R. Deshaw, Sparta; William A. Peacock, Kentwood, both of Mich.

[73] Assignee: St. Charles Manufacturing Co., St. Charles, Ill.

[21] Appl. No.: 555,082

[22] Filed: Nov. 25, 1983

[51] Int. Cl.[4] ............................................. A47G 29/02
[52] U.S. Cl. ................... 248/225.1; 248/239; 248/246; 248/297.2; 108/144; 211/187
[58] Field of Search ............... 248/239, 225.1, 245, 248/246, 244, 297.2; 108/106, 144, 107; 211/187, 208, 182, 191

[56] References Cited

U.S. PATENT DOCUMENTS

| | | | |
|---|---|---|---|
| 2,329,815 | 9/1943 | Attwood | 108/106 |
| 2,737,268 | 3/1956 | Smith | 248/245 |
| 2,767,951 | 10/1956 | Cousino | 248/245 |
| 3,104,626 | 9/1963 | Brunette | 108/106 |
| 3,375,936 | 4/1968 | Kessler | 248/246 |
| 3,388,809 | 6/1968 | Irish | 248/246 |
| 3,472,476 | 10/1969 | Johnson | 248/245 |
| 4,212,445 | 7/1980 | Hagen | 248/245 |

Primary Examiner—Reinaldo P. Machado
Assistant Examiner—Alvin Chin-Shue
Attorney, Agent, or Firm—Robert E. Wagner; Alan L. Barry

[57] ABSTRACT

A unique component furniture assembly for securing furniture components in wall furniture systems comprises a light-weight metal track, along which glides a novel fastening assembly which receives screws, threaded support posts and the like and to which a given furniture component is secured. The fastening assembly includes a block, preferably a plastic nut, carried by a basket. The block is suspended within the basket by a coil spring or other bias means. Relative expansion of the block and the basket by action of the spring causing contact with inner surfaces of the track causing the fastening assembly to remain stationary, though moveable on the track. The present furniture assembly further includes a plurality of selectively spaced detents, preferably raised protuberances, on the inside bottom surface of the track which function to lock the fastening assembly to the track and are used to align fastening assemblies on adjacent and opposing tracks.

4 Claims, 9 Drawing Figures

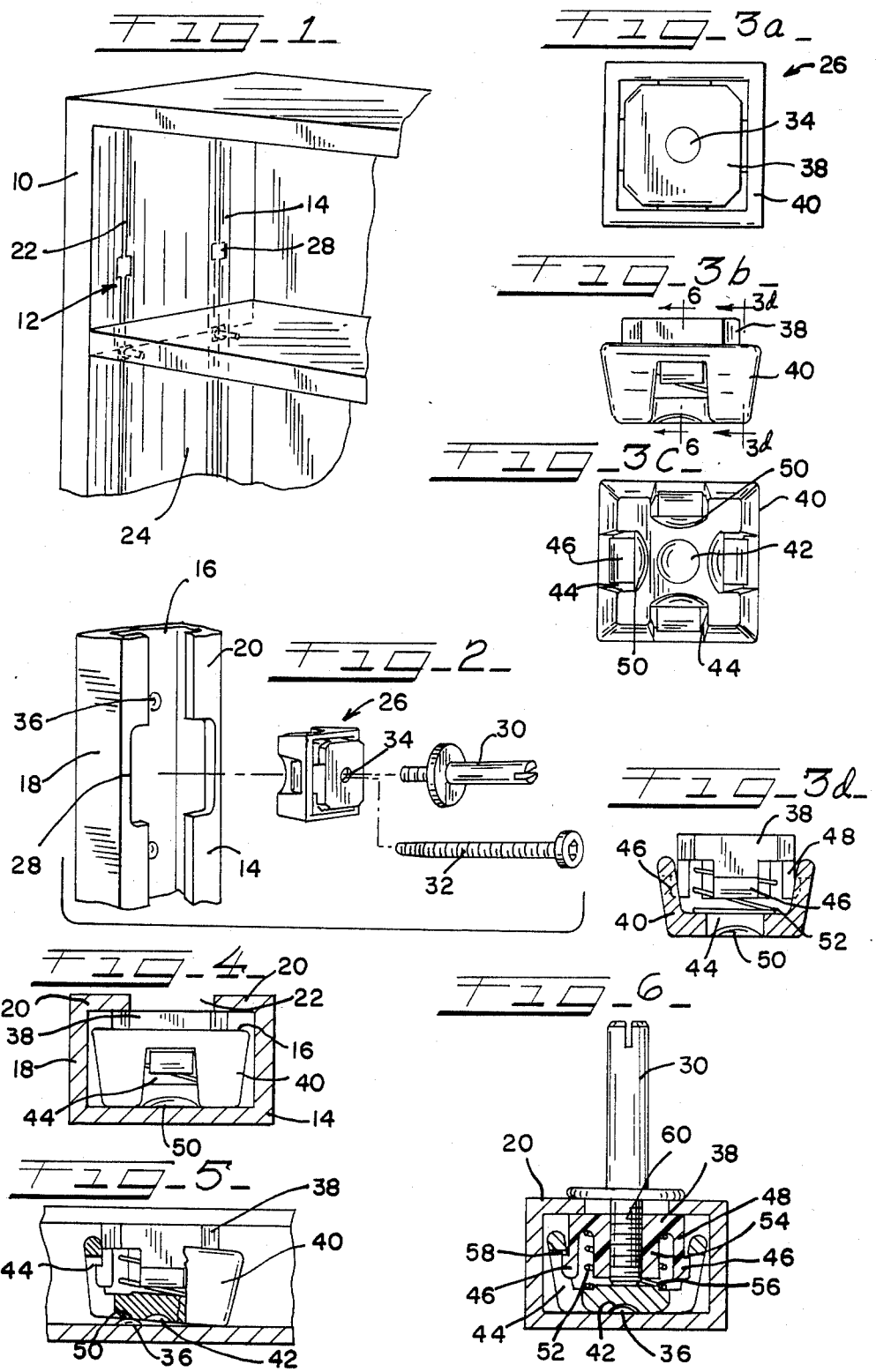

COMPONENT FURNITURE ASSEMBLY

DESCRIPTION

1. Technical Field

The present invention generally relates to furniture assembly devices and, in particular, to an assembly apparatus for fastening, aligning and supporting shelves, cabinets and other components between the common walls of component furniture systems.

2. Background of the Invention

In recent years, a type of residential furnishing has been developed which aggregates several furnishing components, such as cabinets, shelves, television stands and the like in a vertical arrangement within common vertical walls. These arrangements have been termed "furniture systems" or "wall units" because of their overall size and visual dominance in a room.

Typically, the vertical common walls of the furniture system are parallel to each other and have faces which are directed to each other. Recessed in the opposing faces of the vertical common walls, are elongated rails or tracks used as a means of fastening, supporting and aligning a given furniture component within the common walls. A fastening assembly, having means to receive screws or other fastening devices is adjustable along the length of the elongated track.

Although there are many furniture assembly devices known in the art, such as disclosed in U.S. Pat. Nos. 3,847,489 and 3,388,809, 3,104,626 and 2,380,379, none of these arrangements are sufficient to permit fastening and proper aligning of the generally heavy furniture components between the common vertical walls of the furniture system. Specifically, the moveable fastening assembly, seated within or on the elongated track, must be held stationary at a selected position on the track while a given furniture component is being positioned and aligned. In this manner, the furniture component can be properly leveled and mounted to the walls with a screw or other fastening device which penetrates a portion of the furniture component and engages the fastening assembly.

In addition to remaining vertically stationary on the elongated track, a fastening assembly must be capable of being easily adjusted to become aligned relative to other fastening assemblies on opposing and adjacent tracks. Without proper alignment of fastening assemblies, a given furniture component will not be horizontally level between the vertical common walls and, as a result, may cause undue stress on the entire furniture system and necessitate unfastening and realignment of the furniture component.

As a result of the development of component furniture systems, a need existed for an adjustable assembly for fastening, supporting and aligning shelves, wall cabinets and other furniture components between the common walls of the system.

SUMMARY OF THE INVENTION

In accordance with the present invention, an adjustable furniture assembly has been developed for use in supporting, fastening and aligning furniture components in wall systems. Generally, the present invention comprises a light-weight metal track, preferably extruded aluminum, along which slides a unique fastening assembly having an aperture to receive screws, threaded support posts and other fastening devices. The fastening assembly includes a block, preferably plastic, carried within a light-weight metal basket in which the block is resiliently secured to the basket by a coil spring or other bias means suspended between the block and basket. The fastening assembly is maintained in a stationary position, yet remains movable on the elongated track, by expansion of the block and the basket against inner surfaces of the track caused by action of the coil spring. The fastening assembly is easily moved along the track by simply depressing the block into the basket so that the block no longer contacts an inner surface of the track, and applying lateral force on the fastening assembly to cause movement along the track.

The fastening assembly is detained at determinate positions on the track for furniture alignment purposes by releasable engagement and seating of the underside of the basket with one of many mechanical detents, preferably linearly arranged convex protuberances, found on an inside surface of the track. In addition, seating of the basket on one of the detents provides added securement of the fastening assembly to the track by locking it to the track thereby preventing slippage. Such detents are spaced apart at selected distances in order to achieve alignment of adjacent and opposing fastening assemblies positioned within respective elongated tracks. Seating of the basket on one of the detents is signalled by an audible "click" produced by the coil spring returning the underside of the basket to the bottom of the track. By the fastening assembly sliding along the track a given number of audible signals will be produced. Alignment of fastening assemblies in opposing and adjacent tracks is assured by moving each along the track to produce a like number of audible signals.

The present invention is further described and disclosed through a preferred embodiment presented in the drawings and set forth below in the written description.

BRIEF DESCRIPTION OF THE DRAWINGS

FIG. 1 is a fragmented perspective view of a multicomponent furniture system illustrating placement of the present invention;

FIG. 2 is an exploded perspective view of the components parts of the present invention, namely the fragmented portion of the elongated track, a slidable fastening assembly, a threaded shelf support post and a cabinet fastening screw;

FIG. 3a is a top view of the fastening assembly;

FIG. 3b is a side of the fastening assembly;

FIG. 3c is a bottom view of the fastening assembly;

FIG. 3d is a vertical section viewed along line 3d—3d of FIG. 3b;

FIG. 4 is a vertical section taken through the elongated track illustrating, in side view, the fastening assembly seated therein;

FIG. 5 is a longitudinal vertical section of the elongated track illustrating the fastening assembly in fragmented vertical section; and, FIG. 6 is a vertical section of the elongated track and a vertical section of the fastening assembly viewed along line 6—6 of FIG. 3b.

DETAILED DESCRIPTION OF PREFERRED EMBODIMENT

Referring to the drawings, FIG. 1 illustrates a wall furniture system 10 having a component furniture assembly of the present invention generally referenced by 12. Furniture assembly 12 is comprised of an elongated track 14 preferably manufactured from extruded aluminum. As illustrated in FIG. 4, track 14 preferably has a rectangular, C-shape in section to define a channel 16. Side portions 18 of track 14 have return portions 20 which further define a continuous longitudinal slot 22.

FIG. 1 also illustrates the manner in which track 14 may be recessed into the vertical common wall 24 of wall furniture system 10. Shown in phantom in FIG. 1 and disclosed in FIG. 2, is a fastening assembly generally referenced by 26 which is moveable within channel 16 of track 14. A window 28 is provided in return portions 20 permitting insertion of fastening assembly 26 into channel 16. A threaded shelf support post 30, (shown in phantom in FIG. 1) and screw 32 are removeably insertable into aperture 34 of fastening assembly 26. Also disclosed in FIG. 2 are two of a linear array of mechanical detents, preferably being discrete, convex protuberances 36 raised from the bottom surface of track 14 formed by dimpling an outer surface of track 14. The function of detents 36 will be explained later in greater detail.

FIGS. 3a through 3d, as well as FIG. 6, disclose the preferred structural relationship of the various elements comprising fastening assembly 26. Fastening assembly 26 is comprised of a block or nut 38 and basket 40. Block 38, preferably is made from nylon or any other durable plastic, and has a centrally positioned aperture 34 to receive any suitable fastening device known in the art. In the preferred embodiment, nearly one-half of block 38 is carried within basket 40.

As illustrated in FIG. 4, when assembly 26 is in a normal operating position within channel 16, top surfaces of block 38 contact and slide against underside surfaces of return portions 20 of track 14. Basket 40 rides along the bottom surface of track 14 occasionally contacting inner surfaces of side portions 18 of track 14. When assembly 26 is seated within channel 16, access to aperture 34 is obtained through longitudinal slot 22.

FIG. 3c discloses the preferred configuration of the underside of basket 40 most prominent of which is a centrally positioned cavity 42. Cavity 42 permits basket 40 to seat over one of detents 36 in an operation to be described later. FIG. 3c also discloses basket 40 as having windows 44 notched into each side of basket 40 and continuing to include a portion of the underside of basket 40. One function of windows 44 is to receive flanges 46 of block 38 which as shown in section in FIG. 3d extend upwardly from side portions 48. In addition, windows 44 permit basket 40 to ride over detents 36 to achieve seating of one of detents 36 within cavity 42. The aforementioned action of basket 40 riding over detents 36 is further enhanced by a shallow recess 50 interposed between an inside edge of each window 44 and cavity 42.

Further, FIG. 3d discloses in cross-section the manner in which block 38 is suspended resiliently within basket 40 by means of a suitable bias element such as a coil spring 52. In FIG. 6, spring 52 surrounds an internal collar 54 within block 38 and coils downward to seat around a raised ridge 56. Upward movement of block 38 caused by expansion of spring 52 is limited by abutment of a shoulder portion 58 of flange 46 against an inside peripheral edge of window 44 thereby maintaining block 38 within basket 40. As a result of the resilient suspension of block 38 within basket 40, assembly 26 normally seats within channel 16 by the expanding apart of block 38 and basket 40 caused by action of spring 52. Such expansion of the component parts of fastening assembly 26 maintains assembly 26 in an operable position within channel 16. Such expansion of the component parts of assembly 26 causes assembly 26 to remain stationary at any given positions along channel 16. Yet assembly 26 can be easily moved along any selected portion of channel 16 by depressing block 38 into basket 40 compressing spring 52 thereby releasing contact of the top surface of block 38 from the underside of return portions 20. Upon release of downward pressure on block 38, spring 52 again expands, forcing block 38 upward so that the top surfaces of block 38 again contact the underside surfaces of return portions 20.

FIG. 5 discloses an additional feature of the preferred embodiment of the present invention. Specifically, FIG. 5 discloses the manner in which basket 40 rides over one of the mechanical detents, preferably raised convex protuberances 36 to lock assembly 26 onto a selected position along track 14.

In the preferred mode of operation, basket 40 approaches one of the detents 36 with such detent 36 passing through a lower portion of window 44. Next, the detent 36 contacts recess 50 on the underside of basket 40 causing the associated portion of basket 40 to deflect angularly upward, though not impeding progress of basket 40 along channel 16. Recess 50 directs detent 36 to eventually seat within cavity 42. Further movement of assembly 26 is restrained as a result of detent 36 seating within cavity 42. Spring 52 forces basket 40 downward against the bottom surface of channel 16 and block 38 upward against the underside surfaces of return portions 20. In order to release the detention of assembly 26 obtained by the seating of detent 36 within cavity 42, it is necessary to apply additional lateral force against assembly 26 to overcome spring 52 causing it to compress and thereby to unseat detent 36 from cavity 42 permitting resultant movement of basket 40 along track 14.

A unique aspect of the restraint of assembly 26 by seating of detent 36 within cavity 42 is that upon such seating, spring 52 quickly returns basket 40 downward against the bottom surface of track 14. The contact of the underside of basket 40 against the bottom surface of track 14 produces an audible sound, usually a "click", for the following purpose which will now be explained.

One function of detents 36 is to facilitate proper alignment of adjacent and opposing fastening assemblies 26 in respective, adjacent and opposing tracks 14. A linear array of detents 36 extend the length of track 14 and are spaced apart at a predetermined distance, for example, one inch increments. If a given furniture component is to be supported or fastened six inches from the top of wall furniture system 10, then one would first, insert a fastening assembly 26 into channel 16 by placing it through window 28 of track 14. Then, the fastening assembly 26 is moved within channel 16 to the top of track 14. Next, the fastening assembly 26 is moved downward until the sixth detent is reached and seated within cavity 42. Of course, this operation is made considerably easier since, as explained above, each time detent 36 is seated within cavity 42, an audible click sound is emitted when the underside of basket 40 is forced downward by spring 52 to contact the bottom surface of track 14. Hence, one need only count the number of signals produced in order to determine when assembly 26 has been secured at a position six inches from the top of track 14, presuming detents 36 are spaced apart by one inch increments.

An additional function of detents 36 is disclosed in FIG. 6. As previously discussed, assembly 26 inherently maintains a stationary position along track 14 by spring 52 forcing block 38 upward to contact the undersides of return portions 22 and basket 40 downward to contact the bottom surface of track 14, effectively wedging assembly 26 within channel 16. However, given the weight of many of the furniture components used in wall systems, it is necessary that assembly 26 be securely locked within channel 16 and to the bottom surface of track 14 so that slippage of assembly 26 from its position within channel 16 will not be possible. As disclosed in FIG. 6, the seating of detent 36 within cavity 42 detains further movement of assembly 26 along channel 16 by the tongue-and-groove interlocking engagement of detent 36 within cavity 42. Such locking action of detent 36 within cavity 42 is further enhanced by the action of threaded support post 30 or screw 32 as shown in FIG. 6. For example, threaded shaft 60 of support post 30, when fully screwed into assembly 26, abuts downwardly against the inner surface of the bottom of basket 40, thereby assisting the efforts of spring 52 to force basket 40 to the bottom of track 14 maintaining the interlock of detent 36 within cavity 42.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments falling within the scope of the appended claims.

We claim:

1. An apparatus for fastening, supporting and aligning furniture components in multiple component furniture systems comprising:
   (a) an elongated track member, the track member defining an open longitudinal channel;
   (b) a plurality of raised detents, the detents being spaced apart at a predetermined distance on one inner surface of the track member;
   (c) a unitary fastening assembly slideable along the longitudinal channel including,
      a fastening block having at least one aperture, the block riding against an other inner surface of the track member,
      a basket for carrying the block along the channel, the block moveably retained within the basket, the basket riding against the one inner surface of the track member, the basket having at least one cavity on the underside for receiving and releasably engaging one of the detents, and,
      a bias element within the basket, the bias element interposed between the block and the basket, the bias element permitting expansion and compression of the fastening assembly within the channel and engagement of disengagement of the basket with the detents;
   (d) at least one fastener, the fastener being insertable through one aperture of the block, the fastener affixing the fastening assembly at the selected position along the track member;
   such that engagement of the fastening assembly with one of the detents both restrains movement of the fastening assembly along the track member without tightening of the fastener and produces an audible signal to facilitate alignment of fastening assemblies on adjacent and opposing track members on other furniture components.

2. The apparatus of claim 1 wherein the detents include a linear array of discrete convex protuberances.

3. The apparatus of claim 1 wherein the elongated track member is C-shaped in section and defines a longitudinal slot in an outer face of the track member providing access to the channel.

4. In an apparatus for aligning, fastening and supporting furniture components between opposing and adjacent vertical support walls, the walls having elongated tracks secured thereon and apertured fastening nuts slideable along the tracks for receiving fasteners, the improvement comprising:
   (a) a plurality of discrete raised protuberances, the protuberances spaced apart at a predetermined distance on one inner surface of the track,
   (b) a unitary fastening assembly slideable along the track including,
      a fastening nut, the nut having downwardly extending side portions, the side portions having upward turned lower end portions,
      a basket for carrying the nut along the track, the basket having an opening in a lower portion of each side wall, the opening receiving the upward turned lower end portion of the nut to moveably retain the nut within the basket, the basket having at least one cavity on an underside surface for receiving and releasably engaging one of the protuberances, and,
      a spring within the basket and being interposed between the nut and basket, the spring permitting expansion and contraction of the fastening assembly within the track and permitting releasable engagement and disengagement of the basket with the protuberances,
   such that engagement of the fastening assembly on each protuberance both restrains movement of the fastening assembly along the track and produces an audible signal thereby facilitating alignment of fastening assemblies on opposing and adjacent tracks on other furniture components.

* * * * *